(12) United States Patent
Yamamoto et al.

(10) Patent No.: US 12,528,899 B2
(45) Date of Patent: Jan. 20, 2026

(54) METHOD FOR PRODUCING FLUOROPOLYMER

(71) Applicant: DAIKIN INDUSTRIES, LTD., Osaka (JP)

(72) Inventors: Yukari Yamamoto, Osaka (JP); Tadaharu Isaka, Osaka (JP); Yumi Zenke, Osaka (JP); Ryouichi Fukagawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 731 days.

(21) Appl. No.: 17/592,754

(22) Filed: Feb. 4, 2022

(65) Prior Publication Data
US 2022/0153889 A1    May 19, 2022

Related U.S. Application Data

(63) Continuation of application No. PCT/JP2020/028267, filed on Jul. 21, 2020.

(30) Foreign Application Priority Data

Aug. 7, 2019    (JP) .................. 2019-145400

(51) Int. Cl.
| | | |
|---|---|---|
| C08F 214/18 | (2006.01) | |
| C08F 2/18 | (2006.01) | |
| C08F 14/28 | (2006.01) | |
| C08F 214/26 | (2006.01) | |
| C08F 214/28 | (2006.01) | |
| C08K 5/095 | (2006.01) | |

(52) U.S. Cl.
CPC ............ *C08F 214/184* (2013.01); *C08F 2/18* (2013.01); *C08F 214/26* (2013.01); *C08F 214/28* (2013.01); *C08K 5/095* (2013.01)

(58) Field of Classification Search
CPC ................. C08F 4/32; C08F 214/18
See application file for complete search history.

(56) References Cited

U.S. PATENT DOCUMENTS

| 2,988,542 A | * | 6/1961 | Isager ............... C08F 14/18 |
| | | | 526/214 |
| 5,399,643 A | * | 3/1995 | Noda .............. C08F 214/26 |
| | | | 526/254 |
| 2003/0004369 A1 | | 1/2003 | Krasutsky et al. |

FOREIGN PATENT DOCUMENTS

| CN | 104744622 A | 7/2015 |
| JP | 01-129005 A | 5/1989 |
| JP | 06-041247 A | 2/1994 |

OTHER PUBLICATIONS

International Preliminary Report on Patentability with translation of Written Opinion issued Feb. 8, 2022 in International Application No. PCT/JP2020/028267.
International Search Report of PCT/JP2020/028267 dated Oct. 13, 2020 [PCT/ISA/210].

* cited by examiner

*Primary Examiner* — Catherine S Branch
(74) *Attorney, Agent, or Firm* — Sughrue Mion, PLLC

(57) ABSTRACT

A method for producing a fluoropolymer which includes polymerizing a fluoromonomer in an aqueous medium in the presence of a fluorine-containing diacyl peroxide represented by the formula (1): $XRf^aC(=O)OOC(=O)Rf^bY$ (wherein X and Y are each independently H or F; and $Rf^a$ and $Rf^b$ are each independently a C1-C6 linear or branched perfluoroalkylene group optionally containing an ether bond) and a fluorine-containing carboxylic acid represented by the following formula (2): $Z^2Rf^cCOOH$ (wherein $Z^2$ is H or F; and $Rf^c$ is a C1-C3 linear or branched perfluoroalkylene group optionally containing an ether bond when $Z^2$ is H, and $Rf^c$ is a C1 or C2 linear or branched perfluoroalkylene group optionally containing an ether bond when $Z^2$ is F) to provide a fluoropolymer.

2 Claims, No Drawings

METHOD FOR PRODUCING FLUOROPOLYMER

CROSS REFERENCE TO RELATED APPLICATIONS

This application is a Rule 53(b) Continuation of International Application No. PCT/JP2020/028267 filed Jul. 21, 2020, claiming priority based on Japanese Patent Application No. 2019-145400 filed Aug. 7, 2019, the respective disclosures of which are incorporated herein by reference in their entirety.

TECHNICAL FIELD

The disclosure relates to methods for producing a fluoropolymer.

BACKGROUND ART

A method for producing a polymer is known in which a fluorine-based diacyl peroxide is used as a polymerization initiator.

Patent Literature 1 discloses copolymerization of tetrafluoroethylene and hexafluoropropylene in water in the presence of di(ω-hydrododecafluoroheptanoyl)peroxide (polymerization initiator) and ω-hydroperfluoroheptanoic acid.

CITATION LIST

Patent Literature

Patent Literature 1: JP H06-041247 A

SUMMARY

The disclosure relates to a method for producing a fluoropolymer, the method including polymerizing a fluoromonomer in an aqueous medium in the presence of a fluorine-containing diacyl peroxide represented by the following formula (1):

$$XRf^aC(=O)OOC(=O)Rf^bY \quad (1)$$

(wherein X and Y are each independently H or F; and $Rf^a$ and $Rf^b$ are each independently a C1-C6 linear or branched perfluoroalkylene group optionally containing an ether bond) to provide a fluoropolymer, the aqueous medium having a pH of lower than 2.5.

The pH of the aqueous medium is preferably 2.2 or lower.

Advantageous Effects

The disclosure can provide a method for producing a fluoropolymer with improved use efficiency of a polymerization initiator.

The disclosure can also provide a method for producing a fluoropolymer with reduced environmental load.

DESCRIPTION OF EMBODIMENTS

The disclosure is specifically described hereinbelow.

The disclosure relates to a method for producing a fluoropolymer (hereinafter, also referred to as a first production method) including polymerizing a fluoromonomer in an aqueous medium in the presence of a fluorine-containing diacyl peroxide represented by the following formula (1):

$$XRf^aC(=O)OOC(=O)Rf^bY \quad (1)$$

(wherein X and Y are each independently H or F; and $Rf^a$ and $Rf^b$ are each independently a C1-C6 linear or branched perfluoroalkylene group optionally containing an ether bond) (hereinafter, also referred to as a fluorine-containing diacyl peroxide (1)) to provide a fluoropolymer, the aqueous medium having a pH of lower than 2.5.

In the first production method, the aqueous medium has a pH of lower than 2.5. This can reduce hydrolysis of the fluorine-containing diacyl peroxide (1) that serves as a polymerization initiator. As a result, even when the same amount of the fluorine-containing diacyl peroxide (1) is used as in conventional cases, more molecules thereof can serve as starting points for polymerization of a fluoromonomer. This can lead to improved use efficiency of the fluorine-containing diacyl peroxide (1).

In the formula (1), X and Y may be the same as or different from each other, and are preferably the same as each other.

X and Y are preferably F.

In the formula (1), $Rf^a$ and $Rf^b$ may be the same as or different from each other, and are preferably the same as each other.

The perfluoroalkylene group for $Rf^a$ and $Rf^b$ has a carbon number of 1 to 6, preferably 5 or less, while preferably 2 or greater.

The perfluoroalkylene group may optionally contain an ether bond.

The perfluoroalkylene group may be linear or branched.

Examples of the perfluoroalkylene group for $Rf^a$ and $Rf^b$ include —$(CF_2)_n$— (wherein n is an integer of 1 to 6), —CF(CF$_3$) CF$_2$—, —CF(CF$_3$) CF$_2$CF$_2$—, —CF$_2$CF(CF$_3$) CF$_2$—, —CF(CF$_3$)CF$_2$CF$_2$CF$_2$—, —CF$_2$CF(CF$_3$) CF$_2$CF$_2$—, —CF(CF$_3$)CF(CF$_3$)CF$_2$—, —CF(CF$_3$) CF$_2$CF$_2$CF$_2$CF$_2$—, —CF$_2$CF(CF$_3$) CF$_2$CF$_2$CF$_2$—, —CF$_2$CF$_2$CF(CF$_3$) CF$_2$CF$_2$—, —CF(CF$_3$) CF$_2$CF(CF$_3$) CF$_2$—, and —C$_l$F$_{2l}$OC$_m$F$_{2m}$-(wherein l and m are each independently an integer of 1 to 5, and l+m is an integer of 2 to 6).

Preferred examples of the group represented by —C$_l$F$_{2l}$OC$_m$F$_{2m}$— include —(CF$_2$)$_l$O(CF$_2$)$_m$— (wherein l and m are as defined above), —CF(CF$_3$)OCF(CF$_3$) CF$_2$—*, and —C$_2$F$_4$OCF(CF$_3$) CF$_2$—* (wherein * represents the bond with X or Y).

The perfluoroalkylene group is particularly preferably —(CF$_2$)$_n$—.

The fluorine-containing diacyl peroxide (1) is preferably a fluorine-containing diacyl peroxide represented by the following formula (1-1):

$$X(CF_2)_aC(=O)OOC(=O)(CF_2)_bY \quad (1-1)$$

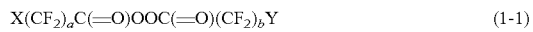

wherein X and Y are each independently H or F; and a and b are each independently an integer of 1 to 6.

In the formula (1-1), a and b may be the same as or different from each other, and are preferably the same as each other.

The upper limit of a and b is preferably 5 and the lower limit thereof is preferably 2.

Examples of the fluorine-containing diacyl peroxide (1) include (HC$_6$F$_{12}$COO)$_2$, (C$_6$F$_{13}$COO)$_2$, (HC$_5$F$_{10}$COO)$_2$, (C$_5$F$_{11}$COO)$_2$, (HC$_4$F$_8$COO)$_2$, (C$_4$F$_9$COO)$_2$, (HC$_3$F$_6$COO)$_2$, (C$_3$F$_7$COO)$_2$, (HC$_2$F$_4$COO)$_2$, (C$_2$F$_5$COO)$_2$, (HCF$_2$COO)$_2$, (CF$_3$COO)$_2$, {(CF$_3$)$_2$CFOCF(CF$_3$)COO}$_2$, and {(CF$_3$)$_2$CFOC$_2$F$_4$COO}$_2$. One or two or more of these may be used.

Preferred among these is at least one selected from the group consisting of (HC$_6$F$_{12}$COO) 2, (C$_5$F$_{11}$COO)$_2$, $(C_3F_7COO)_2$, and $(C_2F_5COO)_2$, more preferred is at least one selected from the group consisting of $\{H(CF_2)_6COO\}_2$, $\{F(CF_2)_5COO\}_2$, $\{F(CF_2)_3COO\}_2$, and $\{F(CF_2)_2COO\}_2$. In order to reduce environmental load, still more preferred is at least one selected from the group consisting of $\{F(CF_2)_5COO\}_2$, $\{F(CF_2)_3COO\}_2$, and $\{F(CF_2)_2COO\}_2$, particularly preferred is at least one selected from the group consisting of $\{F(CF_2)_3COO\}_2$ and $\{F(CF_2)_2COO\}_2$.

The fluorine-containing diacyl peroxide (1) also preferably includes at least one selected from the group consisting of $(C_5F_{11}COO)_2$, $(C_3F_7COO)_2$, and $(C_2F_5COO)_2$, or preferably includes at least one selected from the group consisting of $(C_5F_{11}COO)_2$ and $(C_3F_7COO)_2$, or preferably includes at least one selected from the group consisting of $\{F(CF_2)_5COO\}_2$ and $\{F(CF_2)_3COO\}_2$.

The fluorine-containing diacyl peroxide (1) may be used in an amount determined in accordance with the target fluoropolymer, and may be used in an amount of 0.01 to 1% by mass of the total amount of the fluoromonomer, for example.

The fluorine-containing diacyl peroxide (1) may be fed all at once or may be fed in batches.

The fluorine-containing diacyl peroxide (1) may be directly fed into an aqueous medium, or may be dissolved in a solvent and then fed in the form of solution. From the viewpoint of safety, the fluorine-containing diacyl peroxide (1) is preferably fed in the form of solution.

The solvent may be any one that can dissolve the fluorine-containing diacyl peroxide (1), and may be a non-fluorine solvent or may be a fluorine-containing solvent.

Examples of the non-fluorine solvent include conventionally known solvents, such as fluorine-free organic solvents, e.g., alcohols, ethers, and ketones.

In order to reduce side reactions due to chain transfer, the solvent is preferably a fluorine-containing solvent.

The fluorine-containing solvent contains a fluorine atom in the molecule, and is preferably, but not limited to, one having a boiling point of 25° C. to 100° C. The fluorine-containing solvent may be either aromatic or aliphatic.

Examples of the fluorine-containing solvent include, but are not limited to, perfluorocarbons, hydrochlorofluorocarbons, hydrofluorocarbons, fluorine-containing ethers, and perfluorobenzene. In particular, preferred is at least one selected from the group consisting of perfluorocarbons, hydrochlorofluorocarbons, hydrofluorocarbons, and fluorine-containing ethers, more preferred is at least one selected from the group consisting of perfluorocarbons, hydrofluorocarbons, and fluorine-containing ethers, still more preferred is at least one selected from the group consisting of hydrofluorocarbons and fluorine-containing ethers.

Examples of the perfluorocarbons include perfluorohexane, perfluoropentane, perfluoroheptane, and perfluorooctane.

Examples of the fluorine-containing ethers include fluorine-containing ethers represented by, but not limited to, the following formula (4):

Rf—O—R          (4)

wherein Rf is a C2-C6 fluoroalkyl or alkyl group; R is a C1-C4 fluoroalkyl or alkyl group; and the sum of the carbon numbers of Rf and R is 8 or less.

Rf in the formula (4) is preferably a C2-C5 fluoroalkyl or alkyl group, more preferably a C3-C4 fluoroalkyl group, still more preferably a C4 fluoroalkyl group.

R in the formula (4) is preferably a C1-C3 fluoroalkyl or alkyl group, more preferably a C1 or C2 alkyl group, still more preferably a C1 alkyl group.

The sum of the carbon numbers of Rf and R in the formula (4) is preferably 3 to 7, more preferably 4 to 6, still more preferably 5.

The fluorine-containing ethers each preferably satisfy that the total number of fluorine atoms is 50% or more, more preferably 60% or more, still more preferably 70% or more of the total number of hydrogen atoms and fluorine atoms.

The fluorine-containing ether preferably includes at least one selected from the group consisting of:

a fluorine-containing ether represented by the following formula (5-1):

$F(CF_2)_pO(CH_2)_qH$          (5-1)

(wherein p is an integer of 2 to 6; and q is an integer of 1 to 4);

a fluorine-containing ether represented by the following formula (5-2):

$H(CF_2)_pO(CF_2)_qF$          (5-2)

(wherein p is an integer of 2 to 6; and q is an integer of 1 to 4);

a fluorine-containing ether represented by the following formula (5-3):

$H(CF_2)_pO(CH_2)_qH$          (5-3)

(wherein p is an integer of 2 to 6; and q is an integer of 1 to 4); and a fluorine-containing ether represented by the following formula (5-4):

$X^5(CF_2)_pCH_2O(CF_2)_qH$          (5-4)

(wherein $X^5$ is a fluorine atom or a hydrogen atom; p is an integer of 1 to 5; and q is an integer of 1 to 4), as well as $(CF_3)_2CHOCH_3$, $(CF_3)_2CFOCH_3$, $CHF_2CF_2CH_2OCF_2CHF_2$, $CF_3CHFCF_2OCH_3$, and $CF_3CHFCF_2OCF_3$.

More preferred are $C_4F_9OCH_3$, $C_4F_9OC_2H_5$, $C_3F_7OCH_3$, and $(CF_3)_2CFOCH_3$, and still more preferred is $C_4F_9OCH_3$.

The fluorine-containing ether preferably has a boiling point of −20° C. to 85° C., more preferably 0° C. to 85° C., still more preferably 4° C. to 85° C.

The aqueous medium is a reaction medium where polymerization proceeds and it means a liquid containing water. The aqueous medium may be any liquid containing water, and may be water optionally containing an organic solvent.

Examples of the organic solvent include fluorine-free organic solvents such as alcohols, ethers, and ketones and fluorine-containing organic solvents.

The aqueous medium may contain a solvent for dissolving the aforementioned fluorine-containing diacyl peroxide (1).

In the first production method, the aqueous medium has a pH of lower than 2.5. This can reduce hydrolysis of the fluorine-containing diacyl peroxide (1) and thereby the fluorine-containing diacyl peroxide (1) can be used as a polymerization initiator with improved use efficiency.

In order to achieve much improved use efficiency of the fluorine-containing diacyl peroxide (1), the pH is preferably 2.2 or lower.

In order to reduce corrosion of a polymerization vessel, the pH is preferably 0.5 or higher, more preferably 1.0 or higher, still more preferably 1.2 or higher, further more preferably 1.4 or higher, particularly preferably 1.5 or higher.

Herein, the pH of the aqueous medium can be measured using a pH meter.

In the first production method, the pH is preferably maintained within the aforementioned range during the period from start to end of the polymerization.

Herein, the start of polymerization means the first point of time when both a fluoromonomer and a polymerization initiator are present in the reaction system. The end of polymerization means the point of time when the pressure of the reaction system is released to the atmospheric pressure.

The pH may be adjusted by a method of adding an acidic substance to the aqueous medium, for example. Examples of the acidic substance include inorganic acids and organic acids. Preferred is a carboxylic acid, more preferred is a fluorine-containing carboxylic acid.

The fluorine-containing carboxylic acid is preferably a fluorine-containing carboxylic acid (hereinafter, also referred to as a fluorine-containing carboxylic acid (3)) represented by the following formula (3):

$$Z^3 Rf^d COOH \qquad (3)$$

wherein $Z^3$ is H or F; when $Z^3$ is H, $Rf^d$ is a C1-C6 linear or branched perfluoroalkylene group optionally containing an ether bond; and when $Z^3$ is F, $Rf^d$ is a C1-C5 linear or branched perfluoroalkylene group optionally containing an ether bond.

In a preferred embodiment, the polymerization in the first production method is performed in the presence of a fluorine-containing carboxylic acid (3).

When $Z^3$ is H in the formula (3), $Rf^d$ is a C1-C6 linear or branched perfluoroalkylene group optionally containing an ether bond. When $Z^3$ is H, $Rf^d$ preferably has a carbon number of 1 to 5, more preferably 1 to 3, still more preferably 1 or 2.

When $Z^3$ is F in the formula (3), $Rf^d$ is a C1-C5 linear or branched perfluoroalkylene group optionally containing an ether bond. When $Z^3$ is F, $Rf^d$ preferably has a carbon number of 1 to 3, more preferably 1 or 2.

The perfluoroalkylene group may contain an ether bond. The perfluoroalkylene group may be linear or branched.

Examples of the perfluoroalkylene group for $Rf^d$ include —$(CF_2)_d$— (when $Z^3$ is H, d is an integer of 1 to 6; when $Z^3$ is F, d is an integer of 1 to 5), —$CF(CF_3)CF_2$—, —$CF(CF_3)$ $CF_2CF_2$—, —$CF_2CF(CF_3)CF_2$—, —$CF(CF_3)$ $CF_2CF_2CF_2$—, —$CF_2CF(CF_3)$ $CF_2CF_2$—, —$CF(CF_3)$ $CF(CF_3)$ $CF_2$—, —$CF(CF_3)$ $CF_2CF_2CF_2CF_2$—, —$CF_2CF(CF_3)$ $CF_2CF_2CF_2$—, —$CF_2CF_2CF(CF_3)$ $CF_2CF_2$—, —$CF(CF_3)CF_2CF(CF_3)CF_2$—, and —$C_jF_{2j}OC_kF_{2k}$— (when $Z^3$ is H, j and k are each independently an integer of 1 to 5 and j+k is an integer of 2 to 6; when $Z^3$ is F, j and k are each independently an integer of 1 to 4 and j+k is an integer of 2 to 5).

In particular, the perfluoroalkylene group is preferably —$(CF_2)_d$—.

The fluorine-containing carboxylic acid (3) is preferably a fluorine-containing carboxylic acid represented by the following formula (3-1):

$$Z^3(CF_2)_d COOH \qquad (3-1)$$

wherein $Z^3$ is H or F; when $Z^3$ is H, d is an integer of 1 to 6; and when $Z^3$ is F, d is an integer of 1 to 5.

When $Z^3$ is H in the formula (3-1), d is an integer of 1 to 6, preferably an integer of 1 to 5, more preferably an integer of 1 to 3, still more preferably 1 or 2.

When $Z^3$ is F in the formula (3-1), d is an integer of 1 to 5, preferably an integer of 1 to 3, more preferably 1 or 2.

Examples of the fluorine-containing carboxylic acid (3) include $HC_6F_{12}COOH$, $HC_5F_{10}COOH$, $C_5F_{11}COOH$, $HC_4F_8COOH$, $C_4F_9COOH$, $HC_3F_6COOH$, $C_3F_7COOH$, $HC_2F_4COOH$, $C_2F_5COOH$, $HCF_2COOH$, and $CF_3COOH$. One or two or more of these may be used.

Preferred among these is at least one selected from the group consisting of $H(CF_2)_6COOH$, $H(CF_2)_5COOH$, $F(CF_2)_5COOH$, $H(CF_2)_4COOH$, $F(CF_2)_4COOH$, $H(CF_2)_3COOH$, $F(CF_2)_3COOH$, $H(CF_2)_2COOH$, $F(CF_2)_2COOH$, $HCF_2COOH$, and $CF_3COOH$. In order to achieve both improved use efficiency of a polymerization initiator and reduced environmental load, more preferred is at least one selected from the group consisting of $H(CF_2)_5COOH$, $F(CF_2)_5COOH$, $H(CF_2)_4COOH$, $F(CF_2)_4COOH$, $H(CF_2)_3COOH$, $F(CF_2)_3COOH$, $H(CF_2)_2COOH$, $F(CF_2)_2COOH$, $HCF_2COOH$, and $CF_3COOH$, still more preferred is at least one selected from the group consisting of $H(CF_2)_3COOH$, $F(CF_2)_3COOH$, $H(CF_2)_2COOH$, $F(CF_2)_2COOH$, $HCF_2COOH$, and $CF_3COOH$, further more preferred is at least one selected from the group consisting of $H(CF_2)_3COOH$, $H(CF_2)_2COOH$, $F(CF_2)_2COOH$, $HCF_2COOH$, and $CF_3COOH$, particularly preferred is at least one selected from the group consisting of $H(CF_2)_2COOH$, $F(CF_2)_2COOH$, and $CF_3COOH$.

The fluorine-containing carboxylic acid (3) also preferably includes at least one selected from the group consisting of $HC_6F_{12}COOH$, $C_5F_{11}COOH$, $C_3F_7COOH$, $HC_2F_4COOH$, $C_2F_5COOH$, and $CF_3COOH$, also preferably includes at least one selected from the group consisting of $H(CF_2)_6COOH$, $F(CF_2)_5COOH$, $F(CF_2)_3COOH$, $H(CF_2)_2COOH$, $F(CF_2)_2COOH$, and $CF_3COOH$, and also preferably includes at least one selected from the group consisting of $F(CF_2)_5COOH$, $F(CF_2)_3COOH$, $H(CF_2)_2COOH$, $F(CF_2)_2COOH$, and $CF_3COOH$.

The fluorine-containing carboxylic acid (3) is used in an amount that allows the pH of the aqueous medium to fall within the aforementioned range. For example, the amount may be 0.06 to 2.0% by mass or 0.07 to 1.0% by mass relative to the aqueous medium.

The fluoromonomer preferably includes at least one fluoromonomer selected from, but not limited to, the group consisting of tetrafluoroethylene (TFE), hexafluoropropylene (HFP), vinylidene fluoride (VdF), chlorotrifluoroethylene (CTFE), perfluoro(methyl vinyl ether), perfluoro(ethyl vinyl ether), perfluoro(propyl vinyl ether), trifluoroethylene, vinyl fluoride, a perfluoro(alkyl vinyl ether) represented by the following formula (6-1):

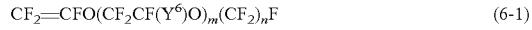

$$CF_2=CFO(CF_2CF(Y^6)O)_m(CF_2)_nF \qquad (6-1)$$

(wherein $Y^6$ is a fluorine atom or a trifluoromethyl group; m is an integer of 0 to 2; and n is an integer of 1 to 4), a monomer represented by the following formula (6-2):

$$CH_2=CF(CF_2)_n Z^6 \qquad (6-2)$$

(wherein $Z^6$ is a fluorine atom or a hydrogen atom; and n is an integer of 1 to 8), and a monomer represented by the following formula (6-3):

$$CH_2=CH(CF_2)_n Z^6 \qquad (6-3)$$

(wherein $Z^6$ is a fluorine atom or a hydrogen atom; and n is an integer of 1 to 8).

The fluoromonomer used may be a fluorine-containing monomer containing a hydrolyzable functional group.

The fluorine-containing monomer containing a hydrolyzable functional group is preferably a monomer represented by the following formula (7):

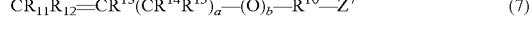

$$CR_{11}R_{12}=CR^{13}(CR^{14}R^{15})_a—(O)_b—R^{10}—Z^7 \qquad (7)$$

wherein $R^{11}$, $R^{12}$, $R^{13}$, $R^{14}$, and $R^{15}$ are the same as or different from each other and are each F or a C1-C3 perfluoroalkyl group; $R^{10}$ is a C1-C8 linear or branched perfluoroalkylene group optionally containing an oxygen atom in the main chain; a is an integer of 0 to 6; b is an integer of 0 or 1; and $Z^7$ is a hydrolyzable functional group.

The fluorine-containing monomer containing a hydrolyzable functional group preferably further contains any of the following structures (7-1) to (7-3):

$$CF_2=CF—(CF_2)_c—Z^7 \tag{7-1}$$

$$CF_2=CF—(CF_2C(CF_3)F)_d—Z^7 \tag{7-2}$$

$$CF_2=CF(CF_2)_e—O—(CF_2CFX^7O)_f—(CF_2)_g—Z^7 \tag{7-3}$$

wherein $X^7$ is F or —$CF_3$; c is an integer of 0 to 8; d is an integer of 1 or 2; e is an integer of 0 to 2; f is an integer of 0 to 3; g is an integer of 1 to 8; and $Z^7$ is a hydrolyzable functional group.

$Z^7$ is preferably —$SO_2F$, —$SO_2Cl$, —$COOA^1$, or —$PO_3A^2A^3$ (wherein $A^1$ is a fluoroalkyl group; and $A^2$ and $A^3$ are the same as or different from each other and are each a fluoroalkyl group.

The fluorine-containing monomer containing a hydrolyzable functional group is more preferably represented by any of the following formulas:

$$CF_2=CF—SO_2F$$

$$CF_2=CFCF_2—SO_2F$$

$$CF_2=CFOCF_2CF_2SO_2F$$

$$CF_2=CFOCF_2CF_2CF_2CF_2SO_2F$$

$$CF_2=CFCF_2OCF_2CF_2SO_2F$$

$$CF_2=CFOCF_2CF(CF_3)OCF_2CF_2SO_2F$$

$$CF_2=CFOCF_2CF_2COOCH_3$$

$$CF_2=CFOCF_2CF(CF_3)OCF_2CF_2COOCH_3.$$

The fluoromonomer used may be a monomer having a cyclic structure or a cyclopolymerizable monomer.

Examples of the monomer having a cyclic structure include perfluoro(2,2-dimethyl-1,3-dioxole), perfluoro(1,3-dioxole), perfluoro(2-methylene-4-methyl-1,3-dioxolane), and 2,2,4-trifluoro-5-trifluoromethoxy-1,3-dioxole.

Examples of the cyclopolymerizable monomer include perfluoro(3-butenylvinyl ether), perfluoro[(1-methyl-3-butenyl)vinyl ether], perfluoro(allyl vinyl ether), and 1,1-[(difluoromethylene)bis(oxy)][1,2,2-trifluoroethene].

In the formula (6-1), m is preferably an integer of 0 or 1, more preferably 0, and n is preferably an integer of 1 to 3.

In the formula (6-2), $Z^6$ is preferably a hydrogen atom, and n is preferably an integer of 1 to 6, more preferably an integer of 1 to 4.

In the formula (6-3), $Z^6$ is preferably a fluorine atom, and n is preferably an integer of 1 to 6, more preferably an integer of 1 to 4.

In the first production method, the fluoromonomer may be polymerized with a non-fluorinated monomer. The non-fluorinated monomer preferably includes at least one selected from the group consisting of ethylene (Et), propylene, 1-butene, 2-butene, an alkyl vinyl ether, vinyl chloride, vinylidene chloride, and an unsaturated carboxylic acid, for example.

The fluoropolymer may be a crystalline polymer or may be an amorphous polymer. The crystalline polymer is a polymer having a melting point owing to melting of crystal, while the amorphous polymer is a polymer having no obvious melting point owing to melting of crystal.

The fluoropolymer is preferably a fluororesin. The fluororesin may be any one containing a polymerized unit based on a fluorine-containing monomer.

The fluoropolymer may have a melting point of 100° C. to 347° C. The lower limit of the melting point may be 150° C., or may be 180° C., or may be 200° C. The upper limit thereof may be 322° C. or may be 320° C.

The melting point can be determined as the temperature corresponding to the maximum value on a heat-of-fusion curve drawn by increasing the temperature at a rate of 10° C./min using a DSC device (available from Seiko Instruments Inc.).

The fluoropolymer is preferably a fluoropolymer containing a polymerized unit based on at least one fluoromonomer selected from the group consisting of tetrafluoroethylene (TFE), hexafluoropropylene (HFP), vinylidene fluoride (VdF), chlorotrifluoroethylene (CTFE), (perfluoromethyl) vinyl ether, (perfluoroethyl)vinyl ether, (perfluoropropyl) vinyl ether, trifluoroethylene, vinyl fluoride, a perfluoro (alkyl vinyl ether) represented by the following formula (6-1):

$$CF_2=CFO(CF_2CF(Y^6)O)_m(CF_2)_nF \tag{6-1}$$

(wherein $Y^6$ is a fluorine atom or a trifluoromethyl group; m is an integer of 0 to 2; and n is an integer of 1 to 4), a monomer represented by the following formula (6-2):

$$CH_2=CF(CF_2)_nZ^6 \tag{6-2}$$

(wherein $Z^6$ is a fluorine atom or a hydrogen atom; and n is an integer of 1 to 8), and a monomer represented by the following formula (6-3):

$$CH_2=CH(CF_2)_nZ^6 \tag{6-3}$$

(wherein $Z^6$ is a fluorine atom or a hydrogen atom; and n is an integer of 1 to 8).

Herein, a polymerized unit based on a monomer refers to a form in which a carbon-carbon unsaturated double bond in a monomer molecule is converted to a single bond.

The fluoropolymer may contain a polymerized unit based on a non-fluorinated monomer. In a preferred embodiment, the fluoropolymer contains a polymerized unit based on at least one non-fluorinated monomer selected from the group consisting of ethylene (Et), propylene, 1-butene, 2-butene, an alkyl vinyl ether, vinyl chloride, vinylidene chloride, and an unsaturated carboxylic acid.

Examples of the fluoropolymer include, but are not limited to, polytetrafluoroethylene (PTFE), TFE/HFP-based copolymers (FEP) such as a TFE/HFP copolymer and a TFE/HFP/perfluoro(alkyl vinyl ether), a TFE/perfluoro(alkyl vinyl ether) copolymer (PFA), an Et/TFE copolymer (ETFE), a TFE/HFP/VdF copolymer (THV), a VdF/TFE copolymer (VT), polyvinylidene fluoride (PVdF), polychlorotrifluoroethylene (PCTFE), and a CTFE/perfluoro(alkyl vinyl ether)/TFE copolymer (CPT).

The fluoropolymer is preferably a melt-fabricable fluoropolymer. Herein, melt-fabricable means that a polymer can be melted and processed using a conventional processing device such as an extruder or an injection molding machine.

The melt-fabricable fluoropolymer preferably has a melt flow rate (MFR) of 0.1 to 100 g/10 min, more preferably 0.5 to 50 g/10 min.

Herein, the MFR is a value obtained as the mass (g/10 min) of a polymer that flows out of a nozzle having an inner diameter of 2 mm and a length of 8 mm per 10 minutes at a predetermined measurement temperature (e.g., 372° C. for PFA and FEP, 297° C. for ETFE) and load (e.g., 5 kg for PFA, FEP, and ETFE) in accordance with the type of the fluoropolymer using a melt indexer in conformity with ASTM D1238.

The fluoropolymer preferably includes at least one selected from the group consisting of ETFE, FEP, and PFA, more preferably at least one selected from the group consisting of FEP and PFA, and is still more preferably FEP.

The fluoropolymer is also preferably a perfluoropolymer.

The ETFE preferably has a ratio by mole (Et unit) (TFE unit) of 20:80 to 80:20, more preferably 35:65 to 55:45. ETFE is a copolymer containing a polymerized unit based on TFE and a polymerized unit based on Et, and may contain a polymerized unit based on a different fluoromonomer or non-fluorinated monomer.

The different fluoromonomer or non-fluorinated monomer may be any one that can be added to both Et and TFE. A C3-C10 fluorine-containing vinyl monomer is easy to use. Examples thereof include hexafluoroisobutylene, $CH_2=CFC_3F_6H$, and HFP. In an embodiment, preferred among these is a fluorine-containing vinyl monomer represented by the following formula (8):

$$CH_2=CH-Rf^4 \quad (8)$$

(wherein $Rf^4$ is a C4-C8 perfluoroalkyl group). The non-fluorinated monomer may be a vinyl monomer represented by the following formula (9):

$$CH_2=CH-R^4 \quad (9)$$

wherein $R^4$ may have any carbon number, may contain an aromatic ring, and may contain a carbonyl group, an ester group, an ether group, an amide group, a cyano group, a hydroxy group, or an epoxy group; $R^4$ is free from a fluorine atom.

In a preferred embodiment, the ETFE is an Et/TFE/HFP copolymer (EFEP), and may further contain a polymerized unit based on a still different fluoromonomer (other than HFP) or non-fluorinated monomer. The still different fluoromonomer and non-fluorinated monomer preferably represent 10 mol % or less, more preferably 5 mol % or less, of the whole polymer. The ratio by mole (Et unit):(TFE unit): (monomer unit based on different fluoromonomer and non-fluorinated monomer) is preferably (31.5 to 54.7):(40.5 to 64.7):(0.5 to 10)

The FEP preferably contains the HFP unit in an amount of more than 2% by mass and 20% by mass or less, more preferably 8 to 15% by mass.

The perfluoro(alkyl vinyl ether) in the PFA preferably contains a C1-C6 alkyl group, and is more preferably perfluoro(methyl vinyl ether), perfluoro(ethyl vinyl ether), or perfluoro (propyl vinyl ether). The PFA preferably contains the perfluoro(alkyl vinyl ether) unit in an amount of more than 2% by mass and 15% by mass or less, more preferably 2.5 to 8.0% by mass.

The FEP or PFA may further contain a different monomer polymerized therein as long as the polymer has the aforementioned composition. An example of the different monomer is a perfluoro(alkyl vinyl ether) for FEP and is HFP for PFA. One or two or more of the different monomers may be used.

In common cases, the different monomer polymerized in the FEP or PFA preferably represents 2% by mass or less of the resulting fluoropolymer, although the amount may differ in accordance with the type of the monomer. The upper limit thereof is more preferably 1.5% by mass.

The amounts of the respective monomer units of the aforementioned copolymers each can be calculated by any appropriate combination of NMR, FT-IR, elemental analysis, and X-ray fluorescence analysis in accordance with the types of the monomers.

The polymerization may be performed by any technique that enables polymerization in an aqueous medium, such as suspension polymerization or emulsion polymerization. Suspension polymerization is preferred.

The polymerization may be performed as follows, for example. Specifically, the aqueous medium and the fluoromonomer as well as a different additive, if necessary, are fed into a reaction container. The contents in the reaction container are stirred and the reaction container is kept at a predetermined polymerization temperature. A predetermined amount of a fluorine-containing diacyl peroxide (1) is then added thereto, so that the polymerization reaction is initiated. Any of additives such as a surfactant, a suspension stabilizer, a chain transfer agent, and a radical scavenger may be fed. The polymerization may be batch polymerization, semi-batch polymerization, or continuous polymerization. The reaction materials used for the polymerization reaction may be added intermittently or continuously after initiation of the polymerization reaction.

The fluorine-containing diacyl peroxide (1) may be dissolved in a solvent before feeding to the reaction container.

Examples of the chain transfer agent include hydrocarbons such as isopentane, n-pentane, n-hexane, and cyclohexane; alcohols such as methanol and ethanol; halogenated hydrocarbons such as carbon tetrachloride, chloroform, methylene chloride, and methyl chloride; and acetone.

The polymerization temperature of the polymerization reaction is preferably, but is not limited to, 0° C. to 100° C., more preferably 10° C. to 90° C. The polymerization pressure is preferably, but is also not limited to, 0.1 to 10 MPa, more preferably 0.3 to 5 MPa.

The polymerization temperature is the temperature of the aqueous medium in the reaction container. The polymerization pressure is the pressure inside the reaction container.

Completion of the polymerization may be followed by aftertreatments such as separation, washing, and drying of the fluoropolymer, if necessary.

The disclosure also relates to a method for producing a fluoropolymer (hereinafter, also referred to as a second production method) including polymerizing a fluoromonomer in an aqueous medium in the presence of a fluorine-containing diacyl peroxide (fluorine-containing diacyl peroxide (1)) represented by the following formula (1):

$$XRf^aC(=O)OOC(=O)Rf^bY \quad (1)$$

(wherein X and Y are each independently H or F; and $Rf^a$ and $Rf^b$ are each independently a C1-C6 linear or branched perfluoroalkylene group optionally containing an ether bond) and a fluorine-containing carboxylic acid (hereinafter, also referred to as a fluorine-containing carboxylic acid (2)) represented by the following formula (2):

$$Z^2Rf^cCOOH \quad (2)$$

(wherein $Z^2$ is H or F; and $Rf^c$ is a C1-C5 linear or branched perfluoroalkylene group optionally containing an ether bond) to provide a fluoropolymer.

In the second production method, coexistence of the fluorine-containing carboxylic acid (2) can reduce hydrolysis of the fluorine-containing diacyl peroxide (1) that serves as a polymerization initiator. As a result, even when the same amount of the fluorine-containing diacyl peroxide (1) is used as in conventional cases, more molecules thereof can serve as starting points for polymerization of a fluoromonomer.

This can lead to improved use efficiency of the fluorine-containing diacyl peroxide (1).

The fluorine-containing carboxylic acid (2) has a small carbon number. This can lead to reduced environmental load.

The fluorine-containing diacyl peroxide (1), aqueous medium, fluoromonomer, and fluoropolymer in the second production method may be the same as the fluorine-containing diacyl peroxide (1), aqueous medium, fluoromonomer, and fluoropolymer described for the first production method.

The polymerization in the second production method is performed in the presence of a fluorine-containing carboxylic acid (2). This can lead to both improved use efficiency of a polymerization initiator and reduced environmental load.

In the formula (2), the perfluoroalkylene group for $Rf^c$ has a carbon number of 1 to 5, preferably 1 to 3.

When $Z^2$ is H, $Rf^c$ preferably has a carbon number of 1 to 3, more preferably 1 or 2. When $Z^2$ is F, $Rf^c$ preferably has a carbon number of 1 or 2.

The perfluoroalkylene group may contain an ether bond.

The perfluoroalkylene group may be linear or branched.

Examples of the perfluoroalkylene group for $Rf^c$ include —$(CF_2)_c$— (c is an integer of 1 to 5), —$CF(CF_3)CF_2$—, —$CF(CF_3)$ $CF_2CF_2$—, —$CF_2CF(CF_3)$ $CF_2$—, —$CF(CF_3)$ $CF_2CF_2CF_2$—, —$CF_2CF(CF_3)$ $CF_2CF_2$—, —$CF(CF_3)$ $CF(CF_3)$ $CF_2$—, and —$C_hF_{2h}OC_iF_{2i}$— (h and i are each independently an integer of 1 to 4 and h+i is an integer of 2 to 5).

The perfluoroalkylene group is preferably —$(CF_2)_c$—.

The fluorine-containing carboxylic acid (2) is preferably a fluorine-containing carboxylic acid represented by the following formula (2-1):

$$Z^2(CF_2)_cCOOH \quad (2\text{-}1)$$

wherein $Z^2$ is H or F; and c is an integer of 1 to 5.

In the formula (2-1), c is an integer of 1 to 5, preferably an integer of 1 to 3.

When $Z^2$ is H, c is preferably an integer of 1 to 3, more preferably 1 or 2. When $Z^2$ is F, c is preferably 1 or 2.

Examples of the fluorine-containing carboxylic acid (2) include $HC_5F_{10}COOH$, $C_5F_{11}COOH$, $HC_4F_8COOH$, $C_4F_9COOH$, $HC_3F_6COOH$, $C_3F_7COOH$, $HC_2F_4COOH$, $C_2F_5COOH$, $HCF_2COOH$, and $CF_3COOH$. One or two or more of these may be used.

Preferred among these is at least one selected from the group consisting of $H(CF_2)_5COOH$, $F(CF_2)_5COOH$, $H(CF_2)_4COOH$, $F(CF_2)_4COOH$, $H(CF_2)_3COOH$, $F(CF_2)_3COOH$, $H(CF_2)_2COOH$, $F(CF_2)_2COOH$, $HCF_2COOH$, and $CF_3COOH$, more preferred is at least one selected from the group consisting of $H(CF_2)_3COOH$, $F(CF_2)_3COOH$, $H(CF_2)_2COOH$, $F(CF_2)_2COOH$, $HCF_2COOH$, and $CF_3COOH$, still more preferred is at least one selected from the group consisting of $H(CF_2)_3COOH$, $H(CF_2)_2COOH$, $F(CF_2)_2COOH$, $HCF_2COOH$, and $CF_3COOH$, particularly preferred is at least one selected from the group consisting of $H(CF_2)_2COOH$, $F(CF_2)_2COOH$, and $CF_3COOH$.

The fluorine-containing carboxylic acid (2) also preferably includes at least one selected from the group consisting of $C_5F_{11}COOH$, $C_3F_7COOH$, $HC_2F_4COOH$, $C_2F_5COOH$, and $CF_3COOH$, and also preferably includes at least one selected from the group consisting of $F(CF_2)_5COOH$, $F(CF_2)_3COOH$, $H(CF_2)_2COOH$, $F(CF_2)_2COOH$, and $CF_3COOH$.

The fluorine-containing carboxylic acid (2) may be used in an amount of 0.01 to 2.0% by mass, preferably 0.06 to 2.0% by mass, more preferably 0.07 to 1.0% by mass, relative to the aqueous medium, for example.

In the second production method, the aqueous medium may have a pH of 3.1 or lower. In order to more reduce hydrolysis of the fluorine-containing diacyl peroxide (1) and to achieve much improved use efficiency of the fluorine-containing diacyl peroxide (1) as a polymerization initiator, the pH of the aqueous medium is preferably 2.90 or lower.

In order to achieve much more improved use efficiency of the fluorine-containing diacyl peroxide (1), the pH is more preferably lower than 2.5, still more preferably 2.2 or lower.

In order to reduce corrosion of a polymerization vessel, the pH is preferably 0.5 or higher, more preferably 1.0 or higher, still more preferably 1.2 or higher, still more preferably 1.4 or higher, particularly preferably 1.5 or higher.

In the second production method, the pH is preferably maintained within the aforementioned range during the period from start to end of the polymerization.

The pH may be adjusted by a method of adjusting the amount of the fluorine-containing carboxylic acid (2) used, for example.

Other conditions of the polymerization and aftertreatments in the second production method may be the same conditions and treatments as those described for the first production method.

The disclosure also relates to a method for producing a fluoropolymer (hereinafter, also referred to as a third production method) including suspension-polymerizing a fluoromonomer in an aqueous medium in the presence of at least one fluorine-containing diacyl peroxide (hereinafter, also referred to as a fluorine-containing diacyl peroxide (10)) selected from the group consisting of $(C_5F_{11}COO)_2$, $(C_3F_7COO)_2$, and $(C_2F_5COO)_2$ to provide a fluoropolymer.

In the third production method, a fluorine-containing diacyl peroxide (10) having a small carbon number is used. This can lead to reduced environmental load.

The fluorine-containing diacyl peroxide (10) preferably includes at least one selected from the group consisting of $\{F(CF_2)_5COO\}_2$, $\{F(CF_2)_3COO\}_2$, and $(C_2F_5COO)_2$. In order to achieve much reduced environmental load, more preferred is at least one selected from the group consisting of $\{F(CF_2)_3COO\}_2$ and $(C_2F_5COO)_2$.

The fluorine-containing diacyl peroxide (10) also preferably includes at least one selected from the group consisting of $(C_5F_{11}COO)_2$ and $(C_3F_7COO)_2$, and also preferably includes at least one selected from the group consisting of $\{F(CF_2)_5COO\}_2$ and $\{F(CF_2)_3COO\}_2$.

The fluorine-containing diacyl peroxide (10) may be used in an amount that is determined in accordance with the target fluoropolymer, and may be used in an amount of 0.01 to 1% by mass of the total amount of the fluoromonomer, for example.

The fluorine-containing diacyl peroxide (10) may be fed all at once or may be fed in batches.

The fluorine-containing diacyl peroxide (10) may be directly fed into an aqueous medium, or may be dissolved in a solvent and then fed in the form of solution. From the viewpoint of safety, the fluorine-containing diacyl peroxide (10) is preferably fed in the form of solution.

The solvent used may be any of those mentioned as examples of the solvent for dissolving the fluorine-containing diacyl peroxide (1) in the first production method.

The aqueous medium, fluoromonomer, and fluoropolymer in the third production method may be the same as the aqueous medium, fluoromonomer, and fluoropolymer described for the first production method.

In the third production method, the aqueous medium may have a pH of 3.1 or lower. In order to reduce hydrolysis of the fluorine-containing diacyl peroxide (10) and to achieve improved use efficiency of the fluorine-containing diacyl peroxide (10) as a polymerization initiator, the pH of the aqueous medium is preferably 2.90 or lower.

In order to achieve much improved use efficiency of the fluorine-containing diacyl peroxide (10), the pH is more preferably lower than 2.5, still more preferably 2.2 or lower.

In order to reduce corrosion of a polymerization vessel, the pH is preferably 0.5 or higher, more preferably 1.0 or higher, still more preferably 1.2 or higher, further more preferably 1.4 or higher, particularly preferably 1.5 or higher.

In the third production method, the pH is preferably maintained within the aforementioned range during the period from start to end of the polymerization.

The suspension polymerization in the third production method is preferably performed in the presence of a fluorine-containing carboxylic acid (3) represented by the following formula (3):

$$Z^3Rf^dCOOH \quad (3)$$

wherein $Z^3$ is H or F; when $Z^3$ is H, $Rf^d$ is a C1-C6 linear or branched perfluoroalkylene group optionally containing an ether bond; and when $Z^3$ is F, $Rf^d$ is a C1-C5 linear or branched perfluoroalkylene group optionally containing an ether bond.

Specific examples and preferred examples of the fluorine-containing carboxylic acid (3) are the same as those described for the first production method.

The fluorine-containing carboxylic acid (3) may be used in an amount of, for example, 0.01 to 2.0% by mass, preferably 0.06 to 2.0% by mass, more preferably 0.07 to 1.0% by mass, relative to the aqueous medium.

In the third production method, the pH of the aqueous medium may be adjusted to fall within the aforementioned range by adjusting the amount of the fluorine-containing carboxylic acid (3) used.

Other conditions of the suspension polymerization and aftertreatments in the third production method may be conditions and treatments similar to those described for the first production method.

The disclosure relates to a method for producing a fluoropolymer, the method including
polymerizing a fluoromonomer in an aqueous medium in the presence of a fluorine-containing diacyl peroxide represented by the following formula (1):

$$XRf^aC(=O)OOC(=O)Rf^bY \quad (1)$$

(wherein X and Y are each independently H or F; and $Rf^a$ and $Rf^b$ are each independently a C1-C6 linear or branched perfluoroalkylene group optionally containing an ether bond) to provide a fluoropolymer,
the aqueous medium having a pH of lower than 2.5.

The pH of the aqueous medium is preferably 2.2 or lower.

The disclosure also relates to a method for producing a fluoropolymer, the method including
polymerizing a fluoromonomer in an aqueous medium in the presence of a fluorine-containing diacyl peroxide represented by the following formula (1):

$$XRf^aC(=O)OOC(=O)Rf^bY \quad (1)$$

(wherein X and Y are each independently H or F; and $Rf^a$ and $Rf^b$ are each independently a C1-C6 linear or branched perfluoroalkylene group optionally containing an ether bond) and a fluorine-containing carboxylic acid represented by the following formula (2):

$$Z^2Rf^cCOOH \quad (2)$$

(wherein $Z^2$ is H or F; and $Rf^c$ is a C1-C5 linear or branched perfluoroalkylene group optionally containing an ether bond) to provide a fluoropolymer.

Preferably, in the formula (2), $Rf^c$ has a carbon number of 1 to 3 when $Z^2$ is H and $Rf^c$ has a carbon number of 1 or 2 when $Z^2$ is F.

The fluorine-containing carboxylic acid preferably includes at least one selected from the group consisting of $C_2F_5COOH$, $CF_3COOH$, and $HC_2F_4COOH$.

The aqueous medium preferably has a pH of 2.90 or lower.

The disclosure also relates to a method for producing a fluoropolymer, the method including
suspension-polymerizing a fluoromonomer in an aqueous medium in the presence of at least one fluorine-containing diacyl peroxide selected from the group consisting of $(C_5F_{11}COO)_2$, $(C_3F_7COO)_2$, and $(C_2F_5COO)_2$.

The aqueous medium preferably has a pH of 2.90 or lower.

The suspension-polymerizing is preferably performed in the presence of a fluorine-containing carboxylic acid represented by the following formula (3):

$$Z^3Rf^dCOOH \quad (3)$$

wherein $Z^3$ is H or F; when $Z^3$ is H, $Rf^d$ is a C1-C6 linear or branched perfluoroalkylene group optionally containing an ether bond; and when $Z^3$ is F, $Rf^d$ is a C1-C5 linear or branched perfluoroalkylene group optionally containing an ether bond.

The disclosure is described in more detail below, but the disclosure is not limited to these examples.

The parameters were determined by the following methods.

(pH) The pH of the aqueous medium (aqueous layer) was measured before start of polymerization and after completion thereof using a pH meter (SK-620PHII 6430-00 available from Sato Keiryoki Mfg. Co., Ltd.).

(MFR)
The MFR was obtained as the mass (g/10 min) of a polymer that flowed out of a nozzle having an inner diameter of 2 mm and a length of 8 mm per 10 minutes at 372° C. and a load of 5 kg using a melt indexer in conformity with ASTM D1238.

Experimental Example 1

A 4.1-L-capacity autoclave was charged with 1095 g of distilled water and sufficiently purged with nitrogen. Then, 0.47 g of a fluorine-containing carboxylic acid represented by $H(CF_2)_6COOH$, 1133 g of hexafluoropropylene (HFP), and 12.34 g of perfluoro (propyl vinyl ether) (PPVE) were fed thereto. The inside of the system was maintained at 32° C. and the stirring rate was maintained at 580 rpm. Then, 120 g of tetrafluoroethylene (TFE) was fed and 9.66 g of a solution (10% by mass solution) of a diacyl peroxide represented by $\{F(CF_2)_5COO\}_2$ serving as a polymerization initiator in perfluorohexane (PFH) was fed to initiate polymerization. The same amount of the initiator was further added two hours and four hours after the start of the reaction. Since the pressure inside the system decreased as the polymerization proceeded, tetrafluoroethylene (TFE) was continually fed so that the pressure inside the system was maintained at 1.03 MPa. After 172 g in total of tetrafluoroethylene (TFE) was added, the reaction was stopped. The reaction duration was 4.5 hours.

After the polymerization was finished, the gas inside the system was released until the pressure returned to normal pressure. The autoclave was purged with nitrogen and then opened. A white fluoropolymer powder was collected and dried for 12 hours in a 150° C. electric furnace. The resulting fluoropolymer weighed 193 g.

The pH of the aqueous medium and the MFR of the resulting fluoropolymer are shown in Table 1.

Experimental Examples 2 to 15

Polymerization was performed and a fluoropolymer was obtained as in Experimental Example 1 except that the type and amount of the polymerization initiator and the type and amount of the fluorine-containing carboxylic acid were changed as shown in Table 1 or 2. HFE7100 in the tables refers to hydrofluoroether represented by $C_4F_9OCH_3$.

The pH of the aqueous medium and the MFR of the resulting fluoropolymer are shown in Table 1 or 2.

TABLE 1

|  |  | Experimental Example 1 | Experimental Example 2 | Experimental Example 3 | Experimental Example 4 | Experimental Example 5 | Experimental Example 6 | Experimental Example 7 |
|---|---|---|---|---|---|---|---|---|
| Initiator |  | {F(CF2)5COO}2 (10 mass % solution of PFH) | {F(CF2)5COO}2 (10 mass % solution of PFH) | {F(CF2)5COO}2 (10 mass % solution of PFH) | {F(CF2)5COO}2 (10 mass % solution of PFH) | {F(CF2)5COO}2 (10 mass % solution of PFH) | {F(CF2)5COO}2 (10 mass % solution of PFH) | {H(CF2)6COO}2 (8 mass % solution of HFE7100) |
| Initial amount of initiator solution | [g] | 9.66 | 9.66 | 9.66 | 9.66 | 9.66 | 9.66 | 13.31 |
| Fluorine-containing carboxylic acid |  | H(CF2)6COOH | F(CF2)5COOH | F(CF2)3COOH | F(CF2)2COOH | CF3COOH | H(CF2)2COOH | CF3COOH |
| Amount of fluorocarboxylic acid added | [g] | 0.47 | 0.54 | 0.31 | 0.15 | 0.12 | 0.13 | 0.12 |
| Concentration of fluorocarboxylic acid | [mass %] | 0.043 | 0.049 | 0.028 | 0.014 | 0.011 | 0.012 | 0.011 |
| Duration of polymerization reaction | [h] | 4.5 | 4.5 | 4.5 | 4.5 | 4.5 | 4.5 | 5.5 |
| Amount of TFE | [g] | 292 | 292 | 292 | 292 | 292 | 292 | 292 |
| Amount of HFP | [g] | 1133 | 1133 | 1133 | 1133 | 1133 | 1133 | 1133 |
| Amount of PPVE | [g] | 12.34 | 12.34 | 12.34 | 12.34 | 12.34 | 12.34 | 12.34 |
| MFR | [g/10 min] | 7.9 | 8.0 | 8.2 | 7.9 | 7.6 | 7.8 | 3.7 |
| pH |  | 3.0 | 3.0 | 3.0 | 3.0 | 3.0 | 3.0 | 3.0 |

TABLE 2

|  |  | Experimental Example 8 | Experimental Example 9 | Experimental Example 10 | Experimental Example 11 |
|---|---|---|---|---|---|
| Initiator |  | {F(CF2)5COO}2 (10 mass % solution of PFH) | {F(CF2)5COO}2 (10 mass % solution of PFH) | {F(CF2)5COO}2 (10 mass % solution of PFH) | {F(CF2)5COO}2 (10 mass % solution of PFH) |
| Initial amount of initiator solution | [g] | 9.66 | 9.66 | 9.66 | 9.66 |
| Fluorine-containing carboxylic acid |  | H(CF2)6COOH | F(CF2)5COOH | F(CF2)3COOH | F(CF2)2COOH |

TABLE 2-continued

| | | | | | |
|---|---|---|---|---|---|
| Amount of fluorocarboxylic acid added | [g] | 4.70 | 4.08 | 2.26 | 1.38 |
| Concentration of fluorocarboxylic acid | [mass %] | 0.427 | 0.371 | 0.206 | 0.126 |
| Duration of polymerization reaction | [h] | 4.0 | 4.0 | 4.0 | 4.0 |
| Amount of TFE | [g] | 292 | 292 | 292 | 292 |
| Amount of HFP | [g] | 1133 | 1133 | 1133 | 1133 |
| Amount of PPVE | [g] | 12.34 | 12.34 | 12.34 | 12.34 |
| MFR | [g/10 min] | 9.4 | 9.2 | 9.3 | 9.0 |
| pH | | 2.0 | 2.0 | 2.0 | 2.0 |

| | | Experimental Example 12 | Experimental Example 13 | Experimental Example 14 | Experimental Example 15 |
|---|---|---|---|---|---|
| Initiator | | {F(CF2)5COO}2 (10 mass % solution of PFH) | {F(CF2)5COO}2 (10 mass % solution of PFH) | {H(CF2)6COO}2 (8 mass % solution of HFE7100) | {F(CF2)5COO}2 (10 mass % solution of PFH) |
| Initial amount of initiator solution solution | [g] | 9.66 | 9.66 | 13.31 | 12.70 |
| Fluorine-containing carboxylic acid | | CF3COOH | H(CF2)2COOH | CF3COOH | CF3COOH |
| Amount of fluorocarboxylic acid added | [g] | 0.94 | 1.03 | 0.94 | 5.18 |
| Concentration of fluorocarboxylic acid | [mass %] | 0.086 | 0.094 | 0.009 | 0.471 |
| Duration of polymerization reaction | [h] | 4.0 | 4.0 | 4.9 | 4.1 |
| Amount of TFE | [g] | 292 | 292 | 292 | 292 |
| Amount of HFP | [g] | 1133 | 1133 | 1133 | 1133 |
| Amount of PPVE | [g] | 12.34 | 12.34 | 12.34 | 12.34 |
| MFR | [g/10 min] | 9.5 | 9.4 | 4.7 | 10.0 |
| pH | | 2.0 | 2.0 | 2.0 | 1.5 |

That a fluoropolymer obtained had a higher MFR (smaller molecular weight) even though the polymerization initiator and the fluoromonomers were each used in the same amount means more molecules of the polymerization initiator served as starting points for the polymerization reaction. In other words, the polymerization initiator was more effectively used.

What is claimed is:

1. A method for producing a fluoropolymer, the method comprising polymerizing a fluoromonomer in an aqueous medium in the presence of a fluorine-containing diacyl peroxide represented by the following formula (1):

$$XRf^{a}C(=O)OOC(=O)Rf^{b}Y \qquad (1)$$

wherein (X and Y are each independently H or F; and $Rf^{a}$ and $Rf^{b}$ are each independently a C1-C6 linear or branched perfluoroalkylene group optionally containing an ether bond,) and $CF_3COOH$, to provide a fluoropolymer, wherein the aqueous medium has a pH of 3.1 or lower.

2. The production method according to claim 1, wherein the aqueous medium has a pH of 2.90 or lower.

* * * * *